United States Patent
Yu et al.

(10) Patent No.: US 11,971,891 B1
(45) Date of Patent: Apr. 30, 2024

(54) ACCESSING SILOED DATA ACROSS DISPARATE LOCATIONS VIA A UNIFIED METADATA GRAPH SYSTEMS AND METHODS

(71) Applicant: Citibank, N.A., New York, NY (US)

(72) Inventors: Linfeng Yu, New York, NY (US); Vaibhav Kumar, New York, NY (US); Ashutosh Pandey, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/390,916

(22) Filed: Dec. 20, 2023

(51) Int. Cl.
*G06F 17/00* (2019.01)
*G06F 16/2453* (2019.01)
*G06F 16/26* (2019.01)
*G06F 16/901* (2019.01)

(52) U.S. Cl.
CPC ........ *G06F 16/24545* (2019.01); *G06F 16/26* (2019.01); *G06F 16/9024* (2019.01)

(58) Field of Classification Search
CPC . G06F 16/24545; G06F 16/26; G06F 16/9024
See application file for complete search history.

(56) References Cited

U.S. PATENT DOCUMENTS

| | | | |
|---|---|---|---|
| 9,043,372 B2 * | 5/2015 | Makkar ................ | G06F 16/907 707/827 |
| 10,303,688 B1 * | 5/2019 | Sirin ....................... | G06N 5/01 |
| 10,445,170 B1 * | 10/2019 | Subramanian ......... | G06N 20/10 |
| 2017/0091020 A1 * | 3/2017 | Rat ..................... | H03M 13/093 |
| 2022/0327119 A1 * | 10/2022 | Gasper ................. | G06F 16/906 |

* cited by examiner

*Primary Examiner* — Greta L Robinson
(74) *Attorney, Agent, or Firm* — Perkins Coie LLP

(57) ABSTRACT

Systems and methods for reducing usage of computational resources when accessing siloed data across disparate locations via a unified metadata graph are disclosed. The system receives a user-specified query indicating a request to access a set of data objects. The system then performs natural language processing on the user-specified query to determine a set of phrases corresponding to the user-specified query. The system then accesses a metadata graph to determine a node corresponding to the set of phrases. Using a location identifier corresponding to the determined node, the system determines a data silo storing at least one data object of the set of data objects. The system then generates for display, on a graphical user interface, a visual representation of the at least one data object.

20 Claims, 7 Drawing Sheets

ACCESSING SILOED DATA ACROSS DISPARATE LOCATIONS VIA A UNIFIED METADATA GRAPH SYSTEMS AND METHODS

BACKGROUND

As computing systems become more and more complex, data used by such computing systems often require their own data silos (Database, Datawarehouse or DataLake) to efficiently process data. However, due to each computing system having their own data silo, copies of the data may exist between different silos for different computing systems. As a result, a large amount of compute capacity is required in reading and maintaining a single version of truth amongst copies of data residing in differing data silos distributed across one or more computer systems. Moreover, data in one data silo may be similar to data in another data silo. For instance, as each computing system may require its own unique variable names, sequencing keys and integrity constraints, while the variable names and technical implementation may differ from one data silo to another, the underlying data is the same. While new applications are built using latest technologies and techniques, these quickly become obsolete with the advent of newer and better performing systems. These new and emerging silos compound with time and complexity in business process and building coordinated and consolidated silo which can replace all existing silos require a massive effort to build and verify. When left unchecked this results in similar data residing in a plurality of data silos that could otherwise be used to store new information, further causing a large amount of wasted compute resources.

Figure 1:
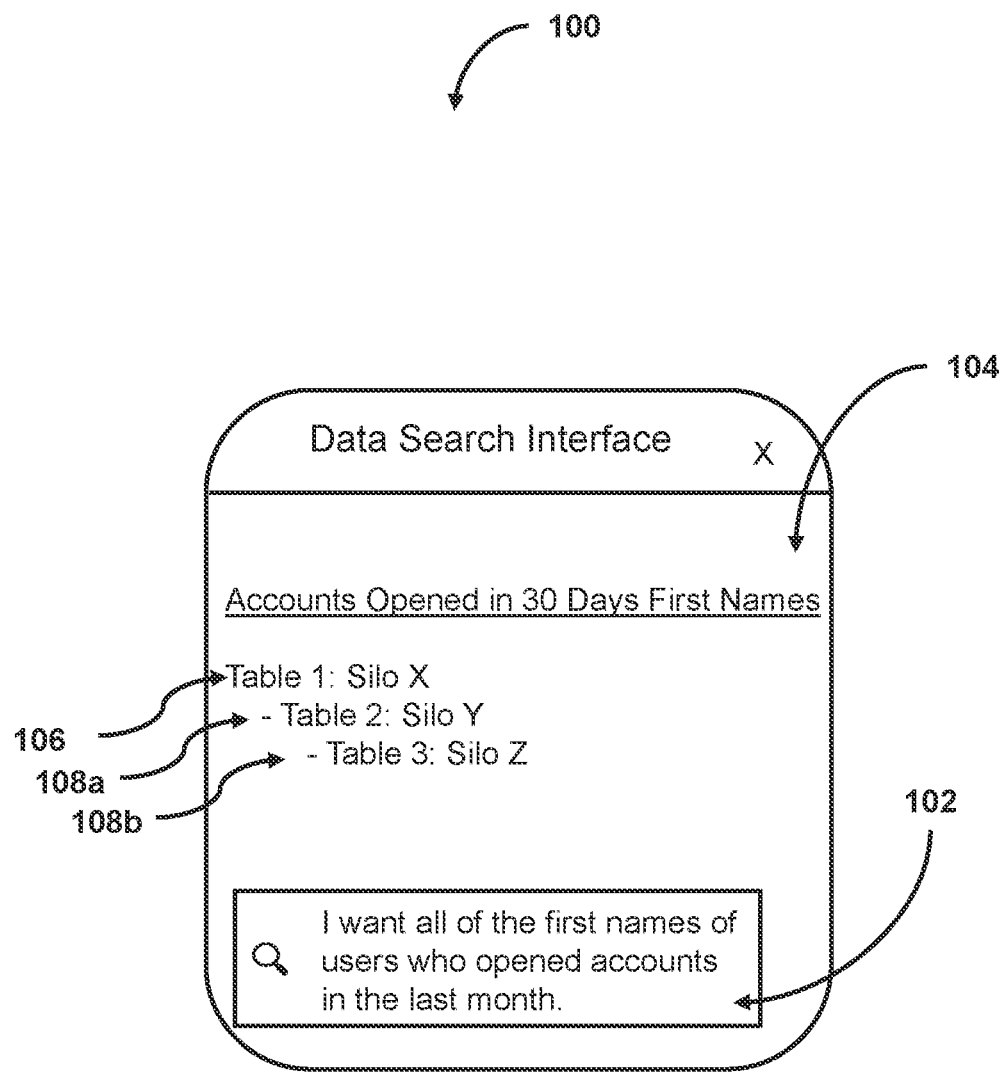
FIG. 1 is an illustrative representation of a Graphical User Interface (GUI) for reducing usage of computational resources when accessing siloed data across disparate locations via a unified metadata graph, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

To preserve data integrity among computing systems, modern computing systems can have a data silo that is created to store data for a given computing system or software application. For example, each data silo may be configured with unique variable names, access protocols (e.g., SQL, AMQP, etc.), data formatting (e.g., relational, non-relational, etc.), or other unique characteristics. Having a data silo that is specifically configured for a given computing system or software application may allow the computing system/software application to not only communicate with the given data silo, but also preserves data integrity of the data within the given data silo as only the data within the silo may be modified, thereby protecting data stored in other data silos.

While data silos provide such benefits, they also result in many drawbacks. For example, one such drawback is that data silos prevent computing systems/software applications that are not configured for communicating with a given data silo to obtain or receive data from that data silo. As each data silo may be configured for a particular software application or computing system, when a new software application is built or when a computing system is scaled, data scientists must either reconfigure the data silo or the software application/computing system. Another drawback is that data silos may store the same or similar information with respect to other data silos. For example, due to the configuration of such data silos (e.g., variable names, access protocols, data formatting, or other characteristics), one data silo may store information that is associated with first variable name, and another data silo may store the same information that is associated with a second variable name, where the first variable and the second variable names are different. Although the variable names are different, the underlying data may be the same (or similar). This causes a large amount of computer memory to be wasted across computing systems as various copies of the data exists among differing data silos. Yet another drawback is that searching for data that may be stored within the data silos is often difficult due to their configuration. For example, as each data silo is separated from other data silos, there is no common interface to search all available data silos at once, thereby causing users to manually search each and every data silo iteratively until the user finds the data they are needing to obtain. Not only time consuming, but such iterative searching causes a large amount of wasted computational resources to be expended due to the hundreds, if not thousands of queries required to be provided to each and every data silo. Data retrieval from a distributed silo becomes increasingly complex, if it is not known where the data is stored.

Existing systems have previously attempted to resolve such drawbacks by utilizing computer and data scientists to create new data silos that may (i) eliminate copies of data and (ii) that are able to communicate with all computing systems/software applications that utilize such data. However, the manual creation of new data silos are practically infeasible to perform. For example, due to the sheer scale of modern computing systems, there may exist hundreds if not thousands of data silos and corresponding computing systems/software applications that would need to be modified to communicate and utilize such data. As such computing systems/software applications rely on large amounts of data stored within such data silos to be processed in real time (or near real time), reconfiguring such systems, applications, or data silos may lead to significant computing system downtimes, thereby impacting a user's experience.

Furthermore, even if computer and data scientists manually create new data silos, there exists the threat of impacting the data integrity of the data to which the data silos store. For example, when creating a new data silo, the computer/data scientists must not only remove copies of the data, but also may need to reformat the data to enable the intended computing systems/software applications to effectively communicate with the data within the data silo. Such modifications to the data may corrupt the data and render such valuable data unusable. Even when data scientists create copies of the data silos in case data stored within a given data silo is corrupted, the further exacerbates the problem of wasted computer memory as even more copies of the data must be created.

Moreover, creating new data silos or reconfiguring existing computing systems/software applications further creates the issue of wasting computational resources (e.g., computer processing and computer memory resources) of the given system. For example, as each data silo, computing system, or software application must be reconfigured/created, computational resources are wasted as each new data silo or new computing system/software application occupies a large volume of memory. As such, creating these new data silos, computing systems, or software applications further exacerbate these issues.

For these and other reasons, there is a need to stop copying data and simplify data access patterns when accessing siloed data across disparate locations via a unified metadata graph. There is a further need to access siloed data across disparate locations to enable users access to such siloed data without creating new data silos, databases, or reconfiguring existing computer systems and/or software applications. There is a further need to preserve data integrity of data stored within data silos without requiring multiple copies of the data stored within the data silos.

For example, as described above, existing systems have no mechanism to access siloed data across disparate locations without creating new computational components. As existing systems rely on the creation of new data silos, databases, computing systems, software applications, and the like to access siloed data, such new computational components require a vast amount of resources to effectively access the data. Furthermore, as these existing systems rely on the creation of new data silos, the time and energy spent can lead to long periods of computing system downtime. Moreover, as existing systems are prone to corrupting the data during a creation process of such computational components, existing systems may rely on creating various copies of data silos themselves, thereby further exacerbating the issue of wasting valuable computer memory resources.

To overcome these and other deficiencies of existing systems, the inventors have developed systems and methods for reducing usage of computational resources when accessing siloed data across disparate locations via a unified metadata graph. For example, the system can receive, at a graphical user interface (GUI), a user-specified query indicating a request to access a set of data objects, where each data object of the set of data objects is stored in a respective data silo of a set of data silos among disparate locations. For instance, the system can receive a user query to access data stored among various data silos. The system can then perform natural language processing on the user specified query to determine a set of phrases corresponding to the user-specified query. For example, to enable non-technically savvy users to access data they want, the system can determine a set of phrases that are contextually accurate (e.g., based on the user query) to provide the data the non-technically savvy user is attempting to access.

The system then accesses a metadata graph to determine a node corresponding to the set of phrases. The metadata graph can comprise (i) a set of nodes comprising (a) metadata indicating internal data objects stored in data silos and (b) location identifiers of the data silos, and (ii) edges indicating data lineages between the set of nodes. For example, by using the metadata graph, the system can traverse the metadata graph that indicates where data (e.g., data objects) are stored, and what data is available among differing data silos. In this way, data scientists need not create new data silos and/or reconfigure existing computing systems/software applications as the metadata graph may provide an abstract layer as to what data is stored where, thereby reducing the utilization of computational resources. Moreover, as the metadata graph includes data lineages between the set of nodes (e.g., a representation of data stored within the data silos themselves), the system can further provide information as to where copies of the data the user intends to access may reside, in which the system may leverage to efficiently find where copied data is hosted. The system then determines a data silo storing at least one data object of the set of data objects using the location identifier corresponding to the determined node to obtain the at least one data object of the set of data objects via the data silo. The system then generates for display, on the GUI, a visual representation of the at least one data object. For example, the system can then provide the data that the non-technically savvy user intends to access. As such, by leveraging the power of a metadata graph to access siloed data, the system may reduce the utilization of computational resources caused by generating new data silos, computing systems, or software applications to access data that is stored across differing data silos at disparate locations.

In various implementations, the methods and systems described herein can reduce utilization of computational resources when accessing siloed data across disparate locations via a unified metadata graph. For example, the system can receive (e.g., via a GUI), a query indicating a request to access a set of data objects, wherein each data object of the set of data objects is stored in a respective data silo of a set of data silos among disparate locations. The system can perform natural language processing on the query to determine a corresponding set of phrases. The system can then access a metadata graph to determine a node corresponding to the set of phrases, where the metadata graph comprises (i) a set of nodes comprising (a) metadata indicating internal data objects stored in data silos and (b) location identifiers of the data silos, and (ii) edges indicating data lineages of the set of nodes, and where the metadata graph is generated using a metadata data structure that is based on file-level and container-level metadata identifiers. The system can then determine a data silo storing at least one data object of the set of data objects using the location identifier corresponding to the determined node to obtain at least one data object of the set of data objects via the data silo. The system can then generate, for display, on the GUI, a visual representation of the at least one data object.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 illustrative representation of a Graphical User Interface (GUI) for reducing usage of computational resources when accessing siloed data across disparate locations via a unified metadata graph, in accordance with some implementations of the present technology. For example, a user interface 100 can include a user-specified query input 102, a results output 104, a visual representation of at least one data object 106, and data lineage information 108 (e.g., 108a-108b) of the at least one data object. For example, user-specified query input 102 may be a data field configured to receive, as input, a user-specified query. Users may provide a query into user-specified query input 102 to access data that may be stored across disparate data silos of a computing system. Results output 104 may include one or more visual representations of at least one data object 106 and data lineage information 108 that correspond to the at least one data object 106. As an example, in the context of non-technically savvy users attempting to find or otherwise access data that may be stored among a set of data silos respective to one or more computing systems, user interface 100 provides a mechanism to enable such users to find the data that they want or need.

Often, users do not know which data silo (e.g., database) hosts the data they intend on obtaining nor know exactly which data they may need for a given application. For instance, a non-technically savvy user, such as a business user, may want a list of all of the first names of users who have been active in the last month. As such, the user may provide a query indicating "I want all of the first names of users who have been active in the last month" to user-specified query input 102, and the system may generate results output 104. As will be explained later, the system may perform natural language processing on the user specified query to obtain a set of phrases (e.g., keywords, semantically similar phrases, etc.) to search a metadata graph. The metadata graph may be a graph that indicates where data is stored and what data is available. For example, as the user-specified query may be in a question format, the system may determine a set of phrases to access the metadata graph by removing unnecessary terms in the user-specified query. Not only may the set of phrases be a "cleaned up" version of the user-specified query, but also may help target what data the user intends on obtaining. By leveraging the access to the metadata graph, the system may display results output 104, which may include a visual representation of the at least one data object 106 (e.g., the data that the user is attempting to access, a location of where the data that the user is attempting to access, a format of how the data that the user is attempting to access is stored, etc.) and may also include a visual representation of data lineage information 108 (e.g., where a copy of, or similar data, may be stored, a format of how the data is stored, etc.). In this way, non-technically savvy users may be provided with a unified, easy-to-use, user interface that provides a central access point for accessing data stored amongst differing data silos at differing locations while improving the user experience.

In some implementations the visual representation of the at least one data object 106 may be interactive. For example, the visual representation of the at least one data object 106 may be an interactive link (e.g., a hyper link) that, upon a user selection of the visual representation of the at least one data object 106, may enable the user to access the data associated with the at least one data object (e.g., by generating a visual representation of a table storing the at least one data object, by generating a window showing the at least one data object, etc.). In this way, users are enabled to quickly and efficiently view the data they intend to access.

Suitable Computing Environments

Figure 2:
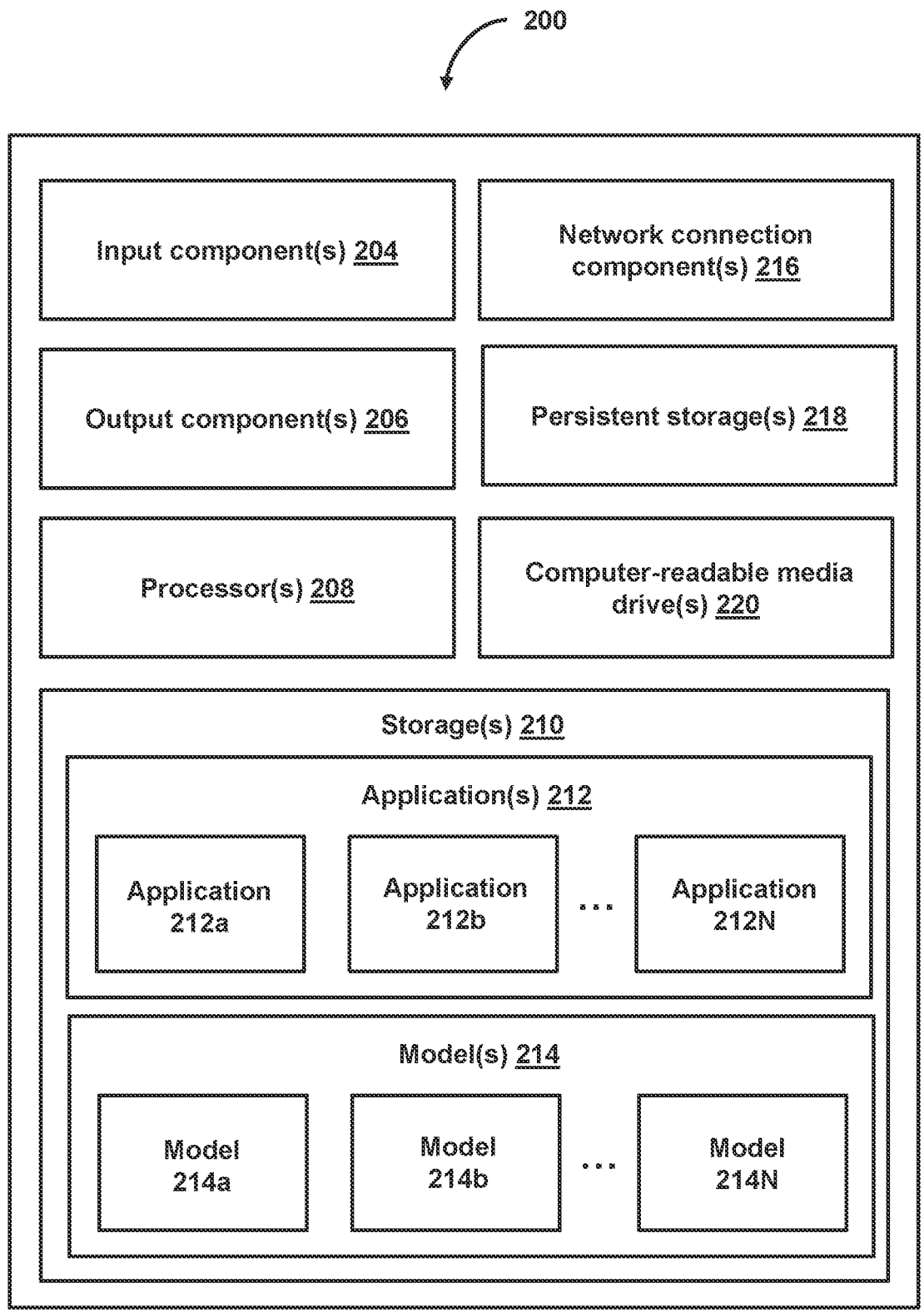
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214), and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
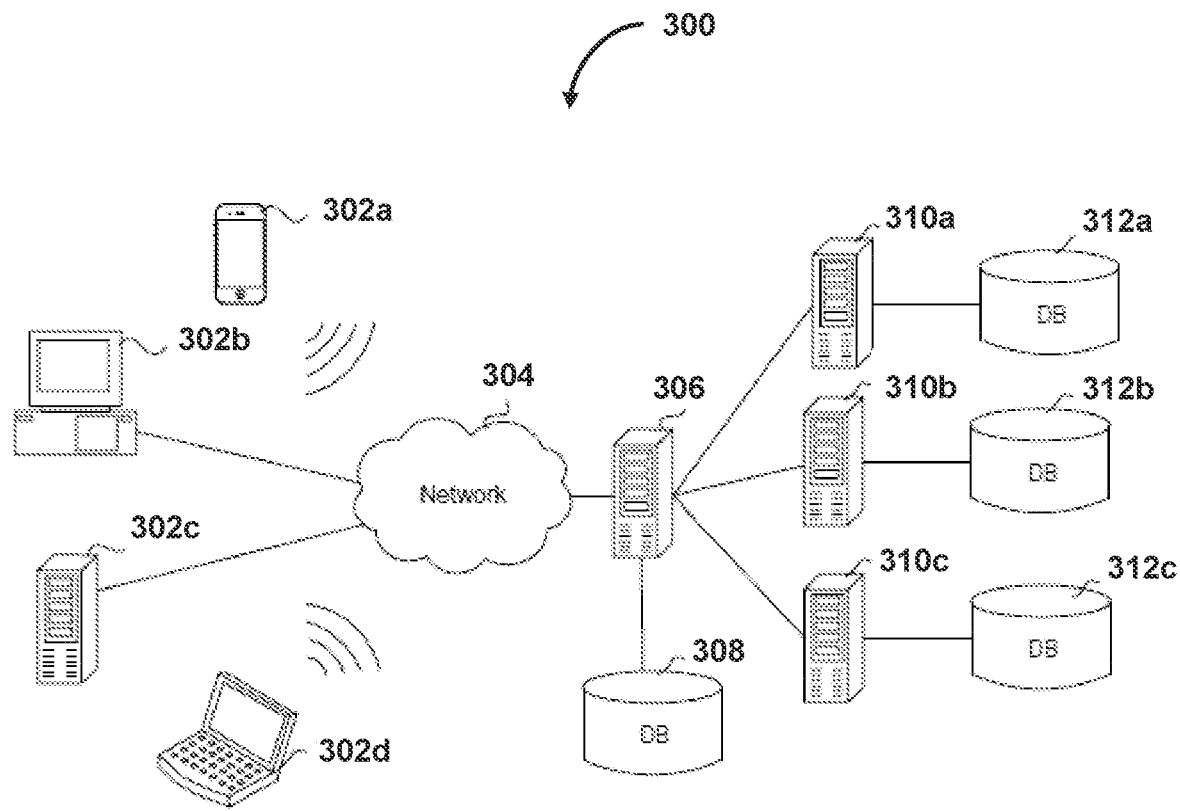
FIG. 3 is a system diagram illustrating an example of a computing environment in which the disclosed system operates in some implementations of the present technology.

FIG. 3 is a system diagram illustrating an example of a computing environment in which the disclosed system operates in some implementations. In some implementations, environment 300 includes one or more client computing devices 302a-d, examples of which can host a metadata graph 500 (FIG. 5) (or other system components). For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server computing device 310 can correspond to a group of servers, and each of these servers can share a database or can have its own database (e.g., data silos). Databases 308 and 312 warehouse (e.g., store) information such as, predefined ranges, predefined thresholds, error thresholds, graphical representations, machine learning models, artificial intelligence models, natural language processing models, keywords, metadata graphs, location identifiers, lineage information, semantically similar phrases, file-level metadata identifiers, container-level metadata identifiers, governance policies, usage criteria, machine learning model training data, artificial intelligence model training data, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Accessing Siloed Data Across Disparate Locations

Figure 4:
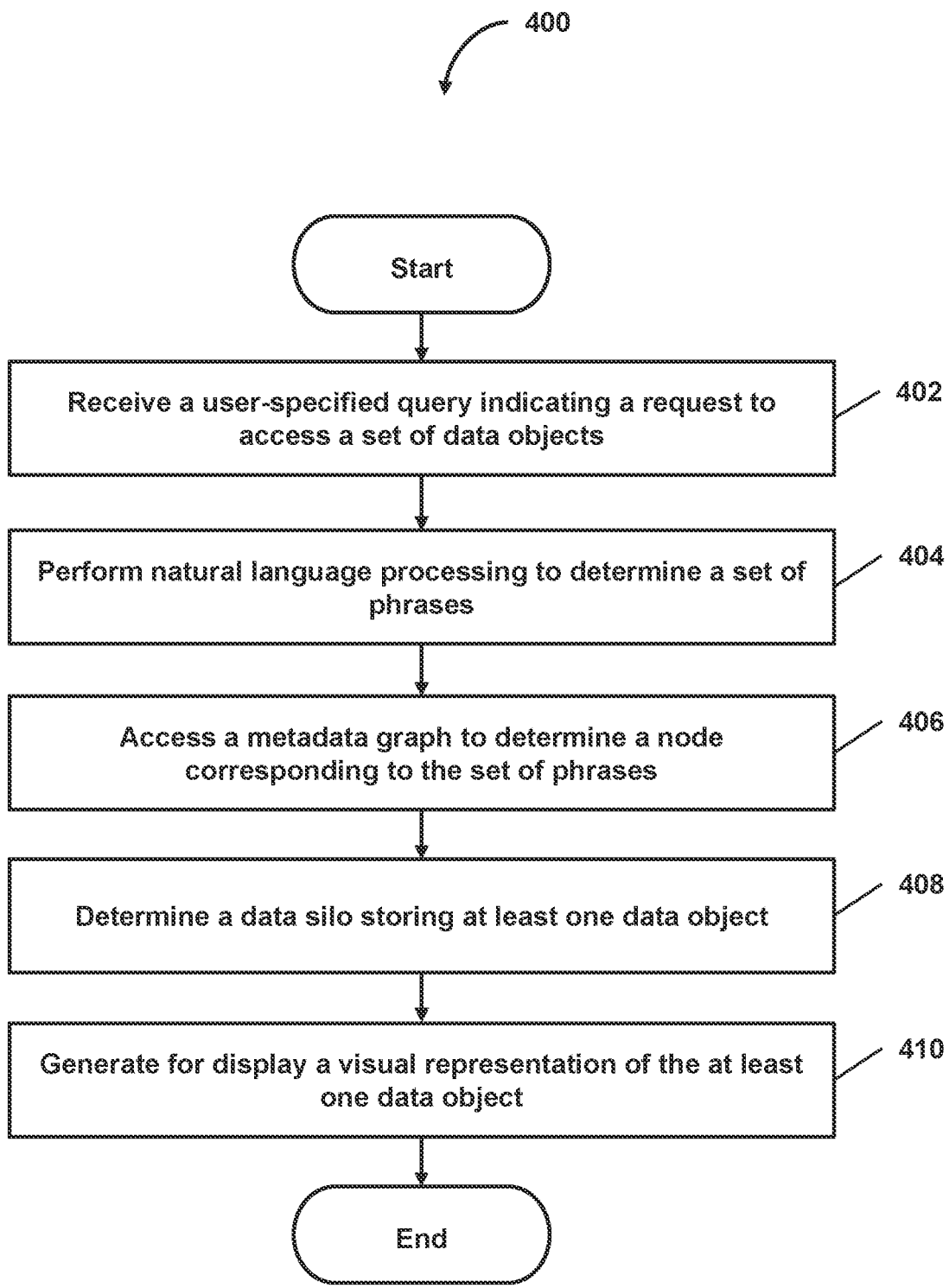
FIG. 4 is a flow diagram illustrating a process of reducing usage of computational resources when accessing siloed data across disparate locations via a unified metadata graph, in accordance with some implementations of the present technology.

FIG. 4 is a flow diagram illustrating a process 400 of reducing usage of computational resources when accessing siloed data across disparate locations via a unified metadata graph, in accordance with some implementations of the present technology.

At act 402, process 400 receives a user-specified query indicating a request to access a set of data objects. For example, the system receives, at a GUI, a user-specified query indicating a request to access a set of data objects, where each data object of the set of data objects is stored in a respective data silo of a set of data silos among disparate locations. A data object can be any object, piece of data, or information that may be stored in a data silo, such as a file, information included within a file (e.g., a first name, last name, email address, home address, business address, financial information, account identifiers, number of accounts, values, percentages, ratios, alphanumeric strings, sentences, etc.), a table, a data structure, or other data objects.

The data objects (e.g., that a user is attempting to access) can be stored across varying data silos (e.g., databases) within a computing environment (e.g., environment 300 (FIG. 3)). For example, the user may want to access account related data of one or more user accounts. However, the account related data may be stored in one or more data silos within the computing environment. For instance, one data silo may indicate how many accounts are currently opened/active (e.g., a first data object), and another data silo may indicate the names of users who have opened accounts (e.g., a second data object). As the user may be unaware as to where such data is located, if at all available. Therefore, the user may provide a user-specified query indicating a request to access a set of data objects, and as will be explained later, the system may return the data to the user (e.g., the set of data objects). In this way, the system improves the user experience as users can access data without needing prior knowledge as to where such data may or may not reside.

At act 404, process 400 can perform natural language processing to determine a set of phrases. For example, the system performs natural language processing on the user-specified query to determine a set of phrases corresponding to the user-specified query. As data stored among data silos can include the same (e.g., copies of) or similar data, the system determines a set of phrases that correspond to the user-specified query to efficiently search for data stored among the data silos. As an example, one data silo that stores user account information, such as users' last names, may store the users last names as a variable called "last_name." However, another data silo that stores user account information may store users' last names as a variable called "given_name." While the data stored is the same (e.g., each silo stores the users' last names), the variable names may be different. As such, when searching for data, the system may determine a set of phrases that correspond to the user provided query to access the data.

In some implementations, the system determines a set of semantically similar phrases that correspond to the user-specified query. For example, the system parses the user-specified query for a set of keywords. The set of keywords may correspond to a set of data objects the that are stored in data silos. For example, the user provides a query (e.g., "I want the first names of all users who have been active in the last month.). The system parses the user provided query for a set of keywords (e.g., first names, active, etc.). For each keyword, the system can determine a set of semantically similar phrases.

For instance, as data may be stored in differing silos for different computer applications across an entity's computing system, the same or similar data may be stored in varying formats. For example, a database storing a table of account information of users may store users' first names as a variable "name_first," "account_ID," "first_name," "name" or others. In this way, the system determines a set of semantically similar phrases corresponding to each respective keyword of the set of keywords to search a metadata graph to obtain the data to which the user intends to receive.

The system can then determine the set of phrases that correspond to the user-specified query using the set of semantically similar phrases that correspond to each keyword of the set of keywords. For example, continuing with the example above, where the user-specified query is "I want the first names of all users who have been active in the last month," The system may determine a first set of semantically similar phrases for "first names" (e.g., "name_first," "account_ID," "first_name," "name") to be used when accessing the metadata graph to determine a node (e.g., that indicates metadata of data objects stored in silos, and lineage data of such data objects). In this way, the system may reduce the usage of computational resources to access siloed data using a metadata graph as the system can determine the location of needed data based on a set of semantically similar phrases (e.g., when traversing the metadata graph) more efficiently as opposed to being limited to a single phrase, keyword, or variable name.

In some implementations, the system can determine semantically similar phrases by accessing a database. For example, the database may indicate a mapping between first keywords and a set of second keywords. In some implementations, the database may store a set of pre-determined keywords that are generated by a Subject Matter Expert (SME). In this way, SMEs may create such database to accurately determine which keywords are semantically similar to other keywords, thereby improving accuracy to which semantically similar phrases are determined.

In some implementations, the database can be based on an artificial intelligence model. For example, due a large volume of user-specified queries, the amount of semantically similar phrases, and the unique data that may be searched for within data silos, the system may use an artificial intelligence model to determine a set of semantically phrases, or to generate the database to determine semantically similar phrases. The artificial intelligence model may be a machine learning model configured to receive keywords (e.g., a phrase) as input and output a set of semantically similar keywords (e.g., semantically similar phrases). Due to the nature of a machine learning model (or other artificial intelligence model) being able to learn associations between training data (e.g., labeled instances of keywords and semantically similar phrases), the model is not restricted to a defined set of keywords and phrases. For instance, the machine learning model may generate new, undiscovered instances of semantically similar phrases that correspond to a given keyword that may be infeasible to the human mind. As such, the system may determine a set of semantically similar phrases that correspond to each respective keyword by using the machine learning model. In this way, the system may determine more robust semantically similar phrases a the machine learning model is not restricted to a set of predetermined keywords, thereby expanding the range of possible semantically similar phrases that may be generated.

In response to accessing the database, the system can determine the set of semantically similar phrases corresponding to the respective keyword by using the respective keyword. For example, the system can parse the database using the respective keyword to determine a match between (i) the respective keyword and (ii) a keyword in the database. Upon identifying a match, the system may obtain the set of semantically similar phrases that correspond to the keyword. In this way, the system may reduce the usage of computational resources when determining semantically similar phrases by using a match as opposed to performing natural language processing on the respective keyword to determine a set of semantically similar phrases.

At act 406, process 400 can access a metadata graph to determine a node corresponding to the set of phrases. For example, the system can access a metadata graph to determine a node corresponding to the set of phrases. The metadata graph may include (i) a set of nodes and (ii) edges indicating data lineages of the set of nodes. The set of nodes may include (a) metadata indicating internal data objects stored in data silos and (b) location identifier of the data silos. As an example, the metadata graph may be a graph data structure that indicates metadata of the information stored in the set of data silos of the environment 300 (FIG. 3).

As discussed above, when accessing data that may be stored in data silos at disparate locations, each data silo may be associated with its own configuration to access data stored within the data silo. When designing computing systems/software applications, data scientists and computer scientists may carefully design the data silos, the computing systems, and software applications to effectively communicate with one another via one or more communication protocols. However, this creates scalability issues when scaling computing systems as required data for a given computing system/software application may be inaccessible due to the configuration of either the computing system/software application or the data silos themselves. Furthermore, searching for the required data may be difficult as the information stored in one data silo may be the same underlying data as in another data silo, albeit with differing variable names (e.g., variable identifiers, metadata identifiers, etc.). When searching for such required data for a given computing system/software application, existing systems may parse each and every data silo that is available for a given match between the data stored within the data silo and the data intended to be accessed (e.g., the required data). However, by parsing each and every data silo within an environment wastes valuable computer processing and memory resources caused by determining whether a match exists between each and every data silo and the information stored therein.

To combat these technical deficiencies, accessing a metadata graph to determine a node corresponding to the set of phrases (e.g., phrases, keywords, alphanumeric strings that correspond to the user-specified query) may be leveraged to quickly and efficiently identify and access data, thereby reducing the usage of computational resources.

Figure 5:
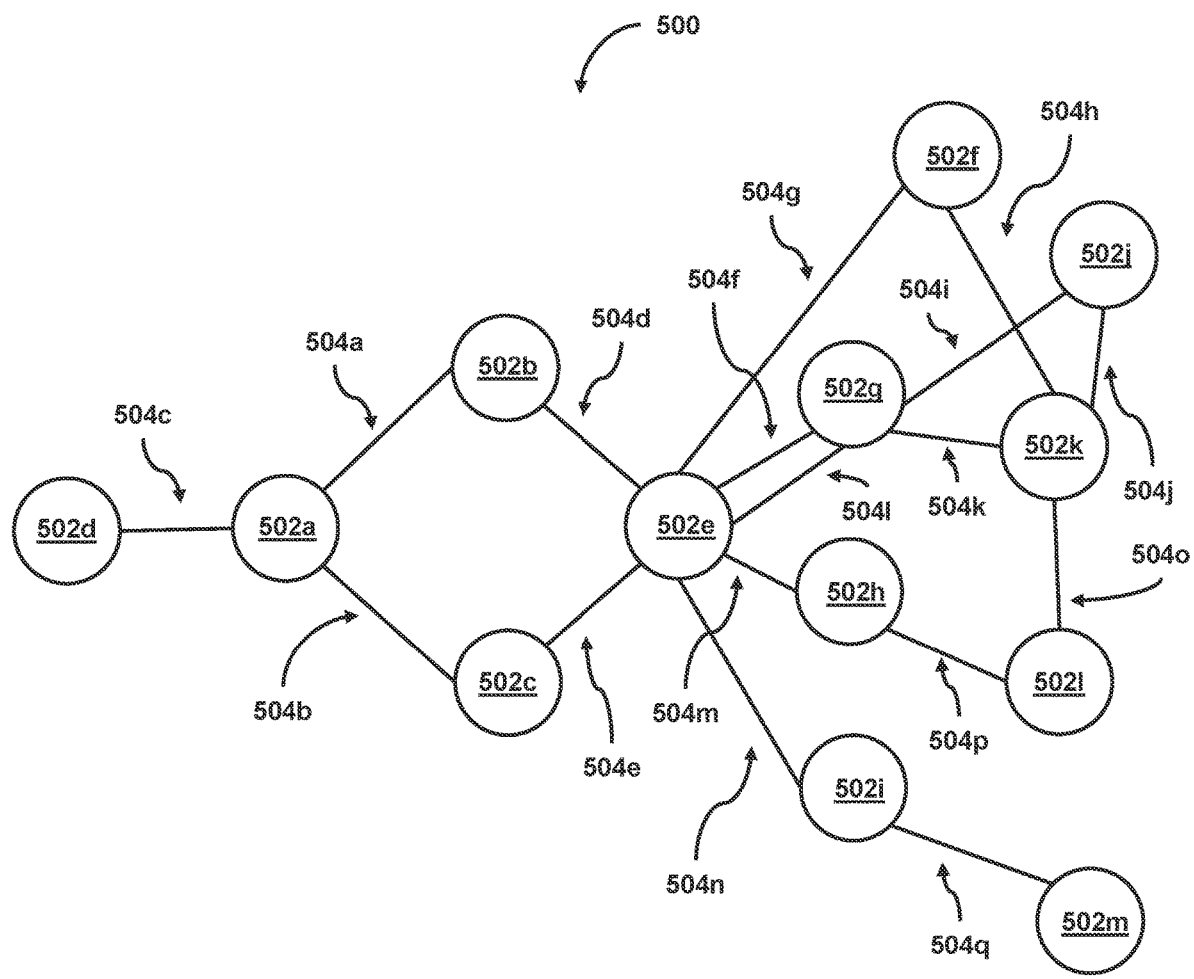
FIG. 5 shows an illustrative representation of a metadata graph, in accordance with some implementations of the present technology.

Referring to FIG. 5 showing a an illustrative representation of a metadata graph, metadata graph 500 may include a set of nodes 502a-502m and edges 504a-504q. Each node 502 may be linked to, or connected to, one or more other nodes via one or more edges 504. Each node 502 may indicate metadata of one or more data silos, such as metadata of internal data objects stored within a given data silo (e.g., file-level metadata), metadata of the data silo itself (e.g., container-level metadata), and location identifiers of a given data silo (e.g., where the data silo is located, such as a computational component node identifier, a server identifier, etc.). Each edge 504 may indicate data lineages of the set of nodes. For example, each edge may represent a lineage relationship between a first node and a second node. That is, each edge may indicate whether a node is a data source of, or a derivative of, another node.

Figure 6:
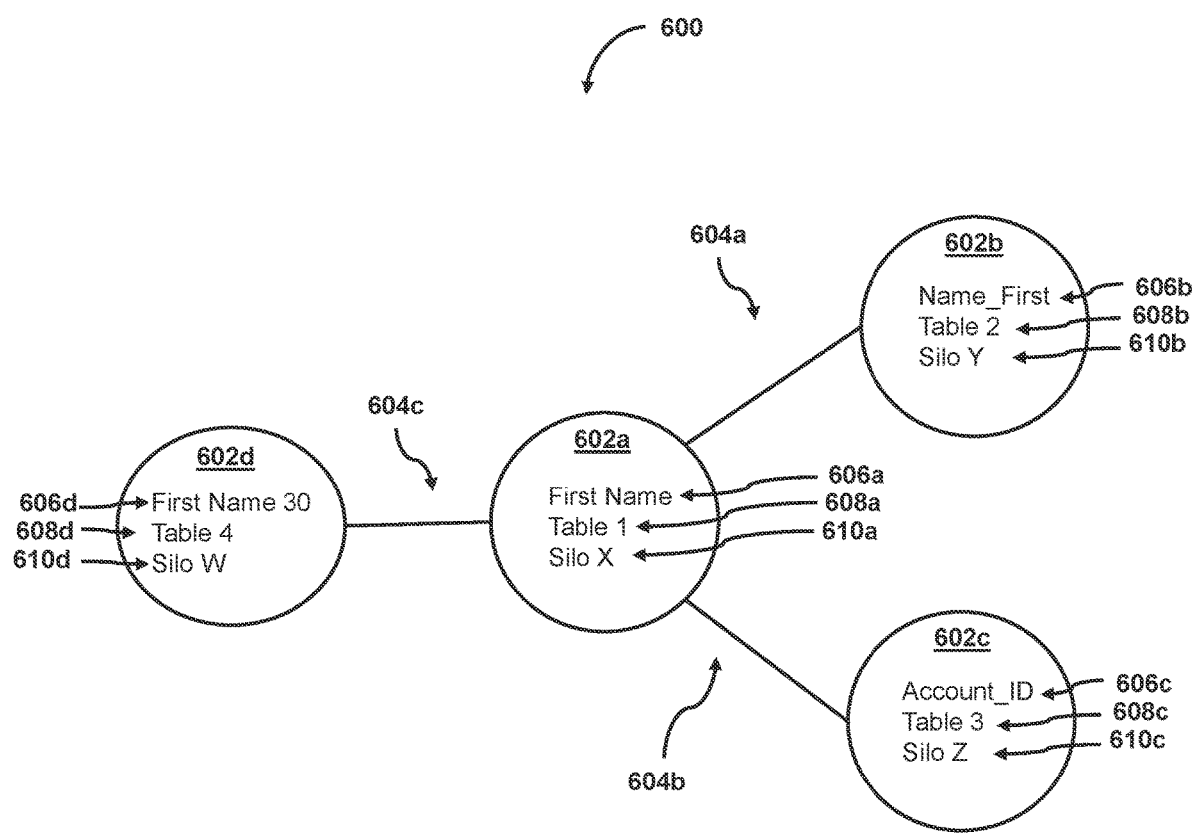
FIG. 6 shows an expanded view of a metadata graph, in accordance with some implementations of the present technology.

For example, FIG. 6. shows an expanded view of a metadata graph. In some implementations, expanded view of metadata graph 600 can correspond to a portion of metadata graph 500, in accordance with some implementations of the present technology. As an example, first node 602a can indicate metadata of one or more data objects stored within a data silo. For example, first node 602a may include a file-level metadata identifier 606a, a container-level metadata identifier 608a, and a location identifier of the data silo 610a. The file-level metadata identifier 606a may be a variable name, a file name, or other identifier that indicates a piece of data that is stored within a given silo. For instance, the file-level metadata identifier may be any identifier that describes data stored within a file stored in the data silo (e.g., variable identifiers, file formats, file sizes, access time stamps, or other file-level metadata). Container-level metadata identifier 608a may be an identifier that identifies a format in which the data stored in the given data silo may be in (e.g., a table format, tabular format, a graphical format, a dictionary, etc.), one or more configurations of the data silo (e.g., communication protocols, accessibility parameters, etc.), or other container-level metadata that is associated with a given data silo. Location identifier 610a may be an identifier that indicates the location of the given data silo. For example, the location identifier may indicate a location of which computer node the data silo is associated with (e.g., stored on, hosted on, connected to, etc.), a computer system that the data silo is associated with, a server that the data silo is hosted at or otherwise associated with, or other location identifier.

Each node of the set of nodes (e.g., nodes 602a-602d) can each have their own file-level metadata identifier 606, container-level metadata identifier 608, or location identifier 610. As each node of the set of nodes may represent an abstract view of how data is derived from one another, where data is located, and what data is available, the system may leverage the metadata graph to efficiently find where data is located, along with lineage information of the data itself. That is, nodes may represent an abstracted view of how data is stored across the data silos, the relationships between the data stored in the data silos, and where the data is stored among the data silos. For example, first node 602a may be linked to second node 602b via first edge 604a. In some implementations, first edge 604a may indicate lineage information of the nodes, such as where second node 602b is a data source of first node 602a. However, in other implementations, first edge 604a may indicate lineage information, such as where first node 602a is a data source of second node 602b, in accordance with some implementations of the present technology. It would be appreciated by one of ordinary skill in the art, that each node 602 may be linked to other nodes via an edge 604, where each edge indicates lineage information between one or more nodes of the set of nodes. By representing the data objects via a metadata graph that indicates (i) where data objects (e.g., the data stored in data silos) are located, (ii) metadata of the data objects themselves, (iii) metadata of the data silos to which store the data objects, and (iv) the locations of such data silos, the system may traverse the metadata graph to access data stored in data silos at disparate locations more efficiently as opposed to existing systems' reliance on manually parsing each and every data silo for a match between data a user is attempting to access and data stored within the silos themselves, thereby reducing the usage of computational resources when accessing siloed data across disparate locations.

In some implementations, the system can determine the node corresponding to the set of phrases by traversing the metadata graph. For example, the system can traverse each node of the set of nodes of the metadata graph. The system can compare a metadata identifier of a given node to each phrase of the set of phrases. For example, the metadata identifier may be a file-level, a container-level, or other identifier that indicates that a given data silo includes data pertaining to the phrase. For example, the metadata identifier may be "first_name" (e.g., a file-level metadata identifier) indicating that the data silo includes first names of users. In response to determining that the metadata identifier matches at least one phrase of the set of phrases, the system may determine the node corresponding to the set of phrases.

For example, as opposed to traversing the metadata graph using a single phrase, the system traverses the metadata graph and compares each phrase of the set of phrases to a metadata identifier of a given node. That is, as opposed to existing techniques that traverse graphs (e.g., metadata graphs or other graphs) using a given keyword, the system traverses the graph using a set of phrases. In this way the system may determine the node corresponding to the set of phrases more efficiently as the system need not perform multiple traversals of the graph using different phrases each time, thereby reducing the usage of computational resources.

In some implementations, the system may determine another data silo storing a second data object. For example, the system can traverse each node of the set of nodes (e.g., of the metadata graph) to identify a metadata identifier matching at least one phrase of the set of phrases. In response to determining that the metadata identifier matches at least one phrase of the set of phrases, the system determines a first node corresponding to the set of phrases. However, although the system may have determined a first node that corresponds to the set of phrases (e.g., thereby determining a data silo to which stores a data object that is associated with the set of phrases), the system may nonetheless continue to traverse the metadata graph to determine other locations (e.g., of data silos) which hosts a given data object.

For example, in the case where the user-specified query indicates "I want all locations of where first names of users reside," the system may continue to traverse the set of nodes using edges connected to a given node. For instance, in response to determining that the first node corresponds to the set of phrases, the system can perform a second traversal of the nodes of the set of nodes to determine a second node using an edge indicating a first data lineage of the first node. The first data lineage of the first node can indicate a second node that includes information that is a source of information associated with the first node. For example, each edge of the metadata graph can indicate a lineage of data objects. As each node of the set of nodes indicates metadata (e.g., data of data), the edges between the nodes can indicate that one node is the source of another node (or alternatively, a derivative data source of another node).

To illustrate, referring to FIG. 6, the system may determine a first node corresponding to the set of phrases, such as first node 602a. The system may traverse to either second node 602b using first edge 604a, to third node 602c using second edge 604b, or to fourth node 602d using third edge 604c. In some implementations, after performing a first traversal (e.g., the traversal from first node 602a to second node 602b), the system may perform second traversal (e.g. from first node 602a to third node 602c). The system may iteratively repeat such traversals until each node has been traversed to, or until no nodes remain that correspond to the set of phrases after performing the traversal. In this way, the system may access siloed data more efficiently by traversing the metadata graph as opposed to parsing each and every data silo within a computing environment for a match.

As such, the system can determine a second data silo storing a second data object (e.g., the same data object or a similar data object related to the at least one data objects) by using a location identifier corresponding to the second node to obtain the second data object of the set of data objects via the second data silo. That is, the system can determine alternate locations (e.g., data silos) to which a given data object may be stored by traversing the metadata graphs using the edges that are connected to a determined node. In this way, the system may determine all locations where the same or similar data may be stored. In some implementations, the system may then generate, on the GUI, a visual representation of the second data object. In this way, a user may be provided with additional data to which they are interested in.

In some implementations, in response to determining each data silo where a given data object is stored, the system can perform one or more data aggregation techniques. For example, the system can remove unnecessary instances of the data itself. For example, as the metadata graph is an abstraction indicating where data is located, and what data a given silo may include, the system may remove all but one instance of the data (e.g., data object) to reduce the amount of computer memory being utilized.

In some implementations, process 400 can generate the metadata graph using a generated metadata data structure. For example, the system can retrieve (i) a set of file-level metadata identifiers and (ii) a set of container-level metadata identifier from each data silo within a given environment (e.g., environment 300). Each file-level metadata identifier of the set of file-level metadata identifier indicate metadata of a given data object stored within a respective data silo, and each container-level metadata identifier of the set of container-level metadata identifiers indicates metadata of the respective data silo of the set of data silos within the given environment. The system can generate a set of semantically similar metadata identifiers corresponding to each file-level and container-level metadata identifier, respectively. For example, the system may perform natural language processing on the file-level and container-level metadata identifiers to determine a set of semantically similar metadata identifiers that correspond to each file-level and container-level metadata identifiers, respectively. For instance, for a file-level metadata identifier of "first_name," the system may generate a set of semantically similar metadata identifiers of "name_first," "account_ID," "user_id," "name," or others.

The system can then generate a metadata data structure to map each semantically similar metadata identifier of the set of semantically similar metadata identifiers to normalized file-level metadata identifier and normalized container-level metadata identifiers. For example, to enable the system to efficiently search for data across the metadata graph, the system can generate a normalized metadata identifier that corresponds to each of the semantically similar phrases (e.g., by using natural language processing, machine learning models, artificial intelligence models, etc.). For instance, the normalized metadata identifier for the set of semantically similar metadata identifiers of "name_first," "account_ID," "user id," "name," can be "first_name_ID," where the metadata data structure maps "first_name_ID" to each of the semantically similar metadata identifiers. In some implementations, the system may generate the metadata graph using the generated metadata data structure (e.g., the normalized metadata identifiers, the set of semantically similar metadata identifiers, etc.). Additionally or alternatively, the system may generate the metadata graph based on an artificial intelligence model. In this way, the system may optimize the metadata graph by using normalized container-level and file-level metadata identifiers associated with the nodes of the metadata-graph to enable more efficient data searching.

Referring back to FIG. 4, at act 408, process 400 can determine a data silo storing at least one data object. For example, the system can determine a data silo of the set of data silos that store at least one data object of the set of data objects using the location identifier corresponding to the determined node (e.g., of act 406) to obtain the at least one data object of the set of data objects via the data silo. As each node of the set of nodes of the metadata graph include a location identifier corresponding to data silos (e.g., indicating which data silo stores a given data object), the system may access the data silo using the location identifier to obtain the data object. For example, the system can use the location identifier of the determined node to determine which data silo hosts the at least one data object of the set of data objects. In some implementations, the system may determine each data silo that stores each data object of the set of data objects using location identifiers corresponding to other determined nodes to obtain the set of data objects. Using the location identifier, the system may determine an communication protocol associated with the determined data silo to obtain the at least one data object. For example, as each data silo may be associated with its own communication protocol, the system may identify which communication protocol the determined data silo is associated with, and select that communication protocol to communicate with the data silo (e.g., query language, access protocol, configuration, etc.) and provide a query to the data silo. As such, the system may obtain the at least one data object via the query. In this way, the system may reduce the amount of wasted computational resources when accessing siloed data across disparate locations via the metadata graph.

At act 410, process 400 can generate for display a visual representation of the at least one data object. For example, the system can generate, for display, on the GUI, a visual representation of the at least one data object. In some implementations, the visual representation of the at least one data object includes lineage information of the at least one data object. For instance, referring to FIG. 1, a visual representation of the at least one data object 106 may be presented for display within the user interface 100, with lineage information 108 that corresponds to the at least one data object. It would be appreciated by one having ordinary skill in the art, that user interface 100 may include one or more visual representations (e.g., of data objects and/or lineage information) that may correspond to the set of data objects, in accordance with one or more implementations of the present technology.

In some implementations, the system can use an artificial intelligence model to generate an intended result. For example, the system can receive, via a second GUI, a second user-specified query indicating a request to generate an intended result. For example, a user may provide a query indicating a request to use an artificial intelligence model to generate an intended result (e.g., a prediction). The intended result can be any user-specified prediction that a user would like to receive. In the context of non-technically savvy users, such users may be ignorant as to what artificial intelligence models/machine learning models to select for generating a given prediction, what data to use to train a given artificial intelligence model/machine learning model, or other components/data to use to generate a given prediction. However, the users may know what they would like to discover (e.g., how many accounts will be opened in the next three months, what week will a company likely receive an influx of accounts opened, what is the expected cost of monitoring for fraud with respect to a set of accounts over a given time period, how many users/accounts are active, how many users/accounts are inactive, etc.). To enable such non-technically savvy users to obtain an intended result, the system may provide a GUI (which may be the same GUI, or similar to the GUI described in FIG. 1) that enables users to provide a query to generate an intended result, and may provide a recommendation as to which artificial intelligence model/machine learning model to use to generate the intended result, and what training data to use to train the artificial intelligence model/machine learning model to generate the intended result.

The system may provide the second user-specified query to an artificial intelligence model to generate a recommendation, where the recommendation includes (i) a second artificial intelligence model to be used to generate the intended result and (ii) a second set of data objects to be used when training the second artificial intelligence model. As an example, the system may provide the user-specified query to an artificial intelligence model (e.g., a machine learning model, model 702 (FIG. 7)) that is trained to generate recommendations. The artificial intelligence model may generate a recommendation that indicates a given artificial intelligence model to use to generate the intended result, and what training data to train the given artificial intelligence model to generate the intended result. For example, the recommended artificial intelligence model can be a artificial intelligence model or a machine learning model that may be configured to generate the intended result. Such recommended artificial intelligence model/machine learning model may be a deep learning model, a neural network, a convolutional neural network, a recurrent neural network, a support vector machine, a natural language processing model, KNN model, a linear regression model, a logistic regression model, a random forest model, a Bayesian model, or other artificial intelligence/machine learning mode. In this way, the system may provide recommendations as to which artificial intelligence models to use to generate an intended result, and what training data to be used to train the artificial intelligence model, thereby reducing the utilization of computational resources that would otherwise be wasted by non-technically savvy users performing multiple incorrect iterations of training a machine learning model to generate the intended result.

In response to receiving a user selection indicating acceptance of the recommendation, the system may (i) access a database to obtain the second artificial intelligence model and (ii) obtain the second set of data objected using the metadata graph, in accordance with some implementations of the present technology. For example, the system may generate a message (e.g., a notification, a user-selectable object, etc.) to enable the user to accept the recommendation (e.g., via a button, via a text-based command, via a checkbox, etc.). In some implementations, the system may automatically accept the recommendation without a user selection to accept the recommendation. In this way, the system may automatically select the recommended artificial intelligence model and training data to generate the intended result, thereby improving the user experience. The system may then access a data base (e.g., an artificial intelligence model database) that stores untrained or pretrained artificial intelligence/machine learning models and obtain the recommended artificial intelligence model (e.g., via an artificial intelligence model identifier, a machine learning model identifier, etc.). The system may also access the metadata graph to obtain the second set of data objects (e.g., to be used as training data for the recommended artificial intelligence/machine learning model). For example, the second set of data objects may be training data stored within one or more data silos of environment 300 to be used as training data for artificial intelligence models. In response to obtaining the recommended artificial intelligence model and the second set of data objects, the system can train the recommended artificial intelligence model using the second set of data objects (e.g., the training data), and can apply the recommended artificial intelligence model (e.g., on input data) to generate the intended result. For example, the system can provide new input data (e.g., new data obtained via the metadata graph) as input to the recommended artificial intelligence model to generate the intended result (e.g., based at least in part on the user-specified query). In this way, non-technically savvy users may be enabled to use artificial intelligence models to generate one or more intended results, thereby improving the user experience.

In some implementations, the system can determine whether an artificial intelligence model's output is approved to be provided to one or more computing systems. For example, as artificial intelligence models and machine learning models are used in various domains for an entity (e.g., a company, business, etc.), the use of such artificial intelligence models/machine learning models may be required to conform to one or more governance standards when using such models for one or more functionalities. As non-technically savvy users may use such models to generate predictions, discover new relationships between existing data, or for other functionalities, the system can ensure that the use of such models, the data being provided to the models, and the outputs generated by the models are in compliance with one or more industry, governmental, or internal standards. In this way, the system may reduce the chance of a data breach, thereby improving data security.

For example, the system can access a governance database to obtain a set of policies indicating usage criteria corresponding to a set of data objects. The governance data base may store policies (e.g., governance policies, industry standards, internal company policies, etc.) that indicate usage criteria (e.g., definitions or other criteria pertaining to how data may be used, generated, provided to other computing systems, provided to external computing environments, published, etc.). The system may access the governance data base to obtain a the set of policies that indicate usage criteria for the second set of data objects (e.g., the data used to train the recommended artificial intelligence model), and may determine whether the second set of data objects are approved to be used to train the recommended artificial intelligence model using the set of policies. For instance, in some implementations, the system can provide (i) the second set of data objects and (ii) the obtained set of policies (e.g., corresponding to the second set of data objects) to another artificial intelligence/machine learning model (e.g., model 702 (FIG. 7)) that is configured to generate a prediction of whether the second set of data objects are approved to be used train the second artificial intelligence model. The system can also determine whether an output of the second artificial intelligence model (e.g., the recommended artificial intelligence model) is approved to be provided to one or more computing systems using a second set of policies indicating usage criteria corresponding to artificial intelligence model predictions. For example, the second set of policies may include information pertaining to what types of artificial intelligence model predictions may be transmitted, provided, published, or sent to internal or external computing systems. In response to (i) the second set of data objects being approved to be used to train the second artificial intelligence model and (ii) the output of the second artificial intelligence model is approved to be provided to the one or more computing systems, the system may apply the second artificial intelligence model (e.g., the recommended artificial intelligence model) to generate the intended result. In this way, the system may vet the training data and the outputs that may be generated by the artificial intelligence model prior to generating the intended result, thereby reducing the chance of a data breach caused by providing such outputs to one or more computing systems.

Figure 7:
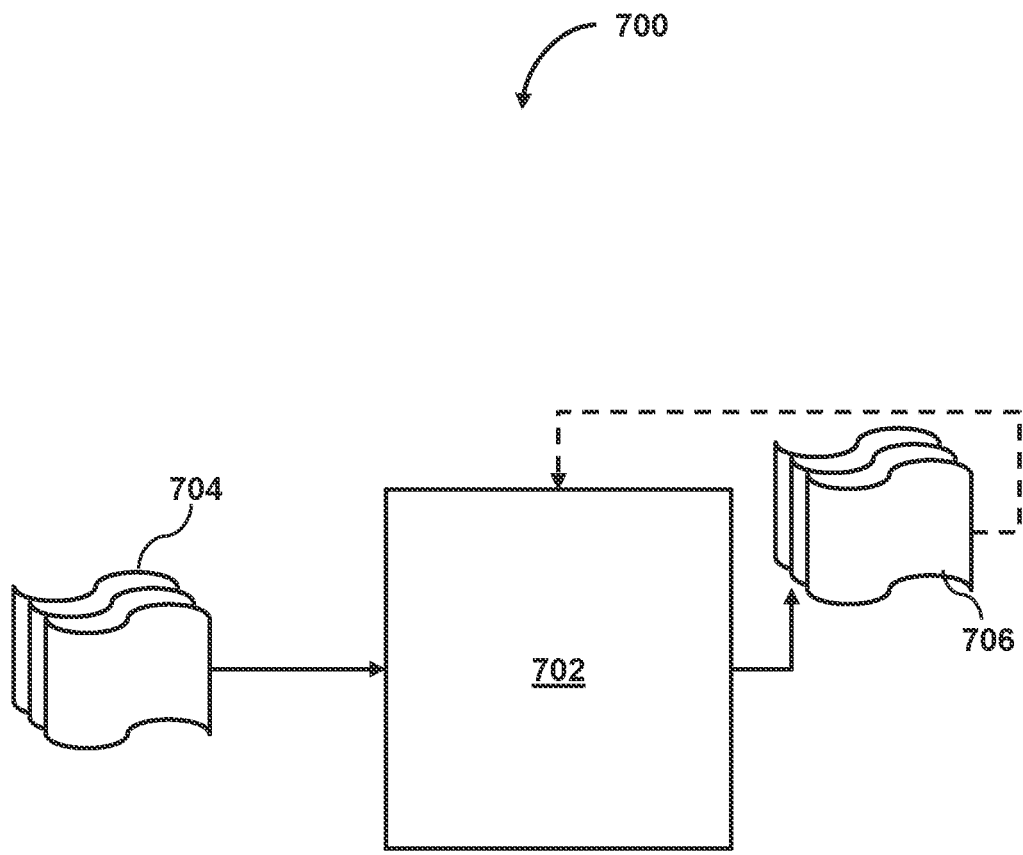
FIG. 7 shows a diagram of an artificial intelligence model, in accordance with some implementations of the present technology.

Referring to FIG. 7, FIG. 7 shows a diagram 700 of an artificial intelligence model, in accordance with some implementations of the present technology. Model 702 may take inputs 704 and provide outputs 706. The inputs may include multiple datasets, such as a training dataset and a test dataset. Each of the plurality of datasets (e.g., inputs 704) may include data subsets related to user data, predicted forecasts and/or errors, and/or actual forecasts and/or errors. In some embodiments, outputs 706 may be fed back to model 702 as input to train model 702 (e.g., alone or in conjunction with user indications of the accuracy of outputs 706, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a response to a user-provided query)

In a variety of implementations, model 702 may update its configurations (e.g., weights, biases, or other parameters) based on the assessment of its prediction (e.g., outputs 706) and reference feedback information (e.g., user indication of accuracy, reference labels, or other information). In a variety of implementations, where model 702 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 702 may be trained to generate better predictions.

In some implementations, model 702 may include an artificial neural network. In such implementations, model 702 may include an input layer and one or more hidden layers. Each neural unit of model 702 may be connected with many other neural units of model 702. Such connections can be enforcing or inhibitory in their effect on the activation state of connected neural units. In some implementations, each individual neural unit may have a summation function that combines the values of all of its inputs. In some implementations, each connection (or the neural unit itself) may have a threshold function such that the signal must surpass it before it propagates to other neural units. Model 702 may be self-learning and trained, rather than explicitly programmed, and can perform significantly better in certain areas of problem solving, as compared to traditional computer programs. During training, an output layer of model 702 may correspond to a classification of model 702, and an input known to correspond to that classification may be input into an input layer of model 702 during training. During testing, an input without a known classification may be input into the input layer, and a determined classification may be output.

In some implementations, model 702 may include multiple layers (e.g., where a signal path traverses from front layers to back layers). In some implementations, back propagation techniques may be utilized by model 702 where forward stimulation is used to reset weights on the "front" neural units. In some implementations, stimulation and inhibition for model 702 may be more free-flowing, with connections interacting in a more chaotic and complex fashion. During testing, an output layer of model 702 may indicate whether or not a given input corresponds to a classification of model 702 (e.g., a response to a user provided query).

In some implementations, the model (e.g., model 702) may automatically perform actions based on outputs 706. In some implementations, the model (e.g., model 702) may not perform any actions. The output of the model (e.g., model 702) may indicate or otherwise be used to generate a metadata graph, determine a set of phrases, determine semantically similar phrases, provide recommendations of artificial intelligence/machine learning models, determine whether data objects are approved to be used to train artificial intelligence/machine learning models, determine whether artificial intelligence/machine learning model outputs are approved to be provided to one or more computing systems, generate responses, or other information, in accordance with one or more implementations of the present technology.

In some implementations, the model (e.g., model 702) can be trained based on training information stored in database 308 or database 312 to generate recommendations. For example, the recommendations may be a recommendation for a given artificial intelligence/machine learning model to generate an intended result and a recommendation for what training data to be used when training the given artificial intelligence/machine learning model. Model 702 can take a first set of training information in as input 704, and generate an output (e.g., a recommendation, recommendations) as output 706. The first set of training information may include user-specified queries indicating a request to generate an intended result (e.g., prediction), artificial intelligence/machine learning model identifiers used to generate the intended result, training data used to train the artificial intelligence/machine learning model use to generate the intended result, or other information. For example, model 702 may learn associations between the first set of training information to generate a recommendation as output 706. The output 706 may be a recommendation as to which artificial intelligence model should be selected to generate the intended result, and which training data should be used to train the artificial intelligence model to generate the intended result. In some embodiments, outputs 706 may be fed back into the model 702 to update one or more configurations (e.g., weights, biases, or other parameters) based on its assessment of its prediction (e.g., outputs 706) and reference feedback information (e.g., user indication of accuracy, reference labels, ground truth information, known recommendations, etc.). The first set of training information may be historical training information that has been used to train prior artificial intelligence/machine learning models to generate a given intended result. In this way, model 702 may be trained to generate one or more recommendations as to which artificial intelligence/machine learning models can generate the intended result, as well as the training data needed to train such artificial intelligence models/machine learning models, thereby enabling non-technically savvy users to leverage artificial intelligence/machine learning models.

In some implementations, the model (e.g., model 702) can be trained based on training information stored in database 308 or database 312 to determine approvals. For example, model 702 can be trained to determine whether training data for a given artificial intelligence/machine learning model is approved for use in training the artificial intelligence/machine learning model and whether the output of the artificial intelligence/machine learning model is approved to be published, transmitted, or provided to one or more computing systems. For example, as explained above, due to the rise of artificial intelligence and machine learning models being used in business contexts, such models are under scrutiny and must be vetted prior to being applied to sensitive user data. To vet such models, model 702 can take a second set of training information in as input 704, and generate an output (e.g., an approval, approvals) as output 706. The second set of training information may include predictions generated by artificial intelligence/machine learning models, artificial intelligence/machine learning model identifiers used to generate the predictions, training data used to train the artificial intelligence/machine learning model used to generate the predictions, sets of policies indicating usage criteria corresponding to data objects (e.g., the training data) used to train the artificial intelligence/machine learning mode used to generate the predictions, a second set of policies indicating usage criteria corresponding to artificial intelligence model predictions, or other information. For example, model 702 may learn associations between the second set of training information to generate a approvals as output 706. The output 706 may be approvals indicating whether the second set of data objects (e.g., the training data) is approved for use to be used to train the artificial intelligence/machine learning model, and whether an output (e.g., prediction) of the artificial intelligence model/machine learning model is approved to be provided to one or more computing In some embodiments, outputs 706 may be fed back into the model 702 to update one or more configurations (e.g., weights, biases, or other parameters) based on its assessment of its prediction (e.g., outputs 706) and reference feedback information (e.g., user indication of accuracy, reference labels, ground truth information, known recommendations, etc.). The second set of training information may be historical information that has been used to provide recommendations as to different data objects (e.g., training data) and machine learning models. In this way, model 702 may be trained to vet artificial intelligence models/machine learning models, their input data, their training data, and their output data prior to being used, in accordance with one or more implementations of the present technology.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for reducing usage of computational resources when accessing siloed data across disparate locations via a unified metadata graph, the system comprising:

at least one hardware processor; and at least one non-transitory memory storing instructions, which, when executed by the at least one hardware processor, cause the system to:

receiving, at a graphical user interface (GUI), a user-specified query indicating a request to access a set of data objects, wherein each data object of the set of data objects is stored in a respective data silo of a set of data silos among disparate locations;

parsing the user-specified query for a set of keywords, wherein each keyword of the set of keywords is associated with the set of data objects;

performing natural language processing on the set of keywords to determine a set of semantically similar phrases corresponding to each keyword of the set of keywords;

accessing a metadata graph to determine a node corresponding to the set of semantically similar phrases, wherein the metadata graph comprises (i) a set of nodes indicating (a) metadata of internal data objects stored in data silos and (b) location identifiers of the data silos, and (ii) edges indicating a data lineage between a first node and a second node of the set of nodes, wherein the metadata graph is generated using a metadata data structure that is based on file-level and container-level metadata identifiers;

determining a data silo storing at least one data object of the set of data objects using the location identifier corresponding to the determined node to obtain the at least one data object of the set of data objects via the data silo; and generating, for display, on the GUI, a visual representation of the at least one data object, wherein the visual representation of the at least one data object comprises lineage information of the at least one data object.

2. The system of claim 1, wherein the metadata graph is generated by:

retrieving (i) a set of file-level metadata identifiers and (ii) a set of container-level metadata identifiers from a second set of data silos, wherein each file-level metadata identifier of the set of file-level metadata identifiers indicates metadata of a given data object stored within a respective data silo, and wherein each container-level metadata identifier of the set of container-level metadata identifiers indicates metadata of the respective data silo of the second set of data silos;

generating a set of semantically similar metadata identifiers corresponding to each file-level and container-level metadata identifiers, respectively;

generating the metadata data structure to map each semantically similar metadata identifier of the set of semantically similar metadata identifiers to normalized file-level metadata identifiers and normalized container-level metadata identifiers; and generating the metadata graph using the generated metadata data structure.

3. The system of claim 1, further comprising the instructions to:

receiving, via a second the GUI, a second user-specified query indicating a request to generate an intended result;

providing the second user-specified query to an artificial intelligence model to generate a recommendation, wherein the recommendation comprises (i) a second artificial intelligence model to be used to generate the intended result and (ii) a second set of data objects to be used when training the second artificial intelligence model;

in response to receiving a user selection indicating acceptance of the recommendation, (i) accessing a database to obtain the second artificial intelligence model and (ii) obtaining the second set of data objects using the metadata graph;

training the second artificial intelligence model using the set of data objects; and applying the second artificial intelligence model to generate the intended result.

4. The system of claim 3, further comprising the instructions to:

accessing a governance database to obtain a set of policies indicating usage criteria corresponding to the second set of data objects;

determining whether the second set of data objects are approved to be used to train the second artificial intelligence model using the set of policies indicating usage criteria corresponding to the set of second data objects;

determining whether an output of the second artificial intelligence model is approved to be provided to one or more computing systems using a second set of policies indicating usage criteria corresponding to artificial intelligence model predictions; and in response to (i) the second set of data objects being approved to be used to train the second artificial intelligence model and (ii) the output of the second artificial intelligence model is approved to be provided to one or more computing systems, applying the second artificial intelligence model to generate the intended result.

5. A method for reducing usage of computational resources when accessing siloed data across disparate locations via a unified metadata graph, the method comprising:

receiving, at a graphical user interface (GUI), a user-specified query indicating a request to access a set of data objects, wherein each data object of the set of data objects is stored in a respective data silo of a set of data silos among disparate locations;

performing natural language processing on the user-specified query to determine a set of phrases corresponding to the user-specified query;

accessing a metadata graph to determine a node corresponding to the set of phrases, wherein the metadata graph comprises (i) a set of nodes comprising (a) metadata indicating internal data objects stored in data silos and (b) location identifiers of the data silos, and (ii) edges indicating data lineages of the set of nodes, wherein the metadata graph is generated using a metadata data structure that is based on file-level and container-level metadata identifiers;

determining a data silo storing at least one data object of the set of data objects using the location identifier corresponding to the determined node to obtain the at least one data object of the set of data objects via the data silo; and generating, for display, on the GUI, a visual representation of the at least one data object.

6. The method of claim 5, wherein the metadata graph is generated by:
retrieving (i) a set of file-level metadata identifiers and (ii) a set of container-level metadata identifiers from a second set of data silos, wherein each file-level metadata identifier of the set of file-level metadata identifiers indicates metadata of a given data object stored within a respective data silo, and wherein each container-level metadata identifier of the set of container-level metadata identifiers indicates metadata of the respective data silo of the second set of data silos;
generating a set of semantically similar metadata identifiers corresponding to each file-level and container-level metadata identifiers, respectively;
generating the metadata data structure to map each semantically similar metadata identifier of the set of semantically similar metadata identifiers to normalized file-level metadata identifiers and normalized container-level metadata identifiers; and
generating the metadata graph using the generated metadata data structure.

7. The method of claim 5, further comprising:
receiving, via a second GUI, a second user-specified query indicating a request to generate an intended result;
providing the second user-specified query to an artificial intelligence model to generate a recommendation, wherein the recommendation comprises (i) a second artificial intelligence model to be used to generate the intended result and (ii) a second set of data objects to be used when training the second artificial intelligence model;
in response to receiving a user selection indicating acceptance of the recommendation, (i) accessing a database to obtain the second artificial intelligence model and (ii) obtaining the second set of data objects using the metadata graph;
training the second artificial intelligence model using the set of data objects; and
applying the second artificial intelligence model to generate the intended result.

8. The method of claim 7, further comprising:
accessing a governance database to obtain a set of policies indicating usage criteria corresponding to the second set of data objects;
determining whether the second set of data objects are approved to be used to train the second artificial intelligence model using the set of policies indicating usage criteria corresponding to the set of second data objects;
determining whether an output of the second artificial intelligence model is approved to be provided to one or more computing systems using a second set of policies indicating usage criteria corresponding to artificial intelligence model predictions; and
in response to (i) the second set of data objects being approved to be used to train the second artificial intelligence model and (ii) the output of the second artificial intelligence model is approved to be provided to the one or more computing systems, applying the second artificial intelligence model to generate the intended result.

9. The method of claim 5, wherein determining the set of phrases corresponding to the user-specified query further comprises:

parsing the user-specified query for a set of keywords, wherein each keyword of the set of keywords is associated with the set of data objects;
for each keyword of the set of keywords associated with the set of data objects, determining a set of semantically similar phrases corresponding to the respective keyword of the set of keywords; and
determining the set of phrases corresponding to the user-specified query using the set of semantically similar phrases corresponding to each keyword of the set of keywords.

10. The method of claim 9, wherein determining a semantically similar phrase corresponding to the respective keyword of the set of keywords further comprises:
accessing a database indicating a mapping between first keywords and a set of second keywords; and
in response to accessing the database, determining the set of semantically similar phrases corresponding to the respective keyword using the respective keyword.

11. The method of claim 5, wherein accessing the metadata graph further comprises:
traversing each node of the set of nodes to identify a metadata identifier matching at least one phrase of the set of phrases; and
in response to determining that the metadata identifier matches the at least one phrase of the set of phrases, determining the node corresponding to the set of phrases.

12. The method of claim 5, wherein accessing the metadata graph further comprises:
traversing each node of the set of nodes to identify a metadata identifier matching at least one phrase of the set of phrases;
in response to determining that the metadata identifier matches at least one phrase of the set of phrases, determining a first node corresponding to the set of phrases;
in response to determining the first node corresponds to the set of phrases, performing a second traversal of the nodes of the set of nodes using an edge indicating a first data lineage of the first node, wherein the first data lineage of the first node indicates a second node that comprises information that is a source of information associated with the first node;
determining a second data silo storing a second data object of the set of data objects using the location identifier corresponding to the second node to obtain the second data object of the set of data objects via the second data silo; and
generating, for display, on the GUI, a second visual representation of the second data object.

13. The method of claim 5, wherein the visual representation of the at least one data object comprises lineage information of the at least one data object.

14. One or more non-transitory computer-readable media storing instructions that, when executed by one or more processors, cause operations comprising:
receiving, at a graphical user interface (GUI), a user-specified query indicating a request to access a set of data objects, wherein each data object of the set of data objects is stored in a respective data silo of a set of data silos among disparate locations;
performing natural language processing on the user-specified query to determine a set of phrases corresponding the user-specified query;
accessing a metadata graph to determine a node corresponding to the set of phrases, wherein the metadata graph comprises (i) a set of nodes comprising (a) metadata indicating internal data objects stored in data silos and (b) location identifiers of the data silos, and (ii) edges indicating data lineages of the set of nodes, wherein the metadata graph is generated using a metadata data structure that is based on file-level and container-level metadata identifiers;
determining a data silo storing at least one data object of the set of data objects using the location identifier corresponding to the determined node to obtain the at least one data object of the set of data objects via the data silo; and
generating, for display, on the GUI, a visual representation of the at least one data object.

15. The media of claim 14, wherein the metadata graph is generated by:
retrieving (i) a set of file-level metadata identifiers and (ii) a set of container-level metadata identifiers from a second set of data silos, wherein each file-level metadata identifier of the set of file-level metadata identifiers indicates metadata of a given data object stored within a respective data silo, and wherein each container-level metadata identifier of the set of container-level metadata identifiers indicates metadata of the respective data silo of the second set of data silos;
generating a set of semantically similar metadata identifiers corresponding to each file-level and container-level metadata identifiers, respectively;
generating the metadata data structure to map each semantically similar metadata identifier of the set of semantically similar metadata identifiers to normalized file-level metadata identifiers and normalized container-level metadata identifiers; and
generating the metadata graph using the generated metadata data structure.

16. The media of claim 14, wherein the instructions, when executed by the one or more processors, further cause operations comprising:
receiving, via a second GUI, a second user-specified query indicating a request to generate an intended result;
providing the second user-specified query to an artificial intelligence model to generate a recommendation, wherein the recommendation comprises (i) a second artificial intelligence model to be used to generate the intended result and (ii) a second set of data objects to be used when training the second artificial intelligence model;
in response to receiving a user selection indicating acceptance of the recommendation, (i) accessing a database to obtain the second artificial intelligence model and (ii) obtaining the second set of data objects using the metadata graph;
training the second artificial intelligence model using the set of data objects; and
applying the second artificial intelligence model to generate the intended result.

17. The media of claim 16, wherein the instructions, when executed by the one or more processors, further cause operations comprising:
accessing a governance database to obtain a set of policies indicating usage criteria corresponding to the second set of data objects;
determining whether the second set of data objects are approved to be used to train the second artificial intelligence model using the set of policies indicating usage criteria corresponding to the set of second data objects;
determining whether an output of the second artificial intelligence model is approved to be provided to one or more computing systems using a second set of policies indicating usage criteria corresponding to artificial intelligence model predictions; and
in response to (i) the second set of data objects being approved to be used to train the second artificial intelligence model and (ii) the output of the second artificial intelligence model is approved to be provided to the one or more computing systems, applying the second artificial intelligence model to generate the intended result.

18. The media of claim 14, wherein determining the set of phrases corresponding to the user-specified query further comprises:
parsing the user-specified query for a set of keywords, wherein each keyword of the set of keywords is associated with the set of data objects;
for each keyword of the set of keywords associated with the set of data objects, determining a set of semantically similar phrases corresponding to the respective keyword of the set of keywords; and
determining the set of phrases corresponding to the user-specified query using the set of semantically similar phrases corresponding to each keyword of the set of keywords.

19. The media of claim 18, wherein determining a semantically similar phrase corresponding to the respective keyword of the set of keywords further comprises:
accessing a database indicating a mapping between first keywords and a set of second keywords; and
in response to accessing the database, determining the set of semantically similar phrases corresponding to the respective keyword using the respective keyword.

20. The media of claim 14, wherein accessing the metadata graph further comprises:
traversing each node of the set of nodes to identify a metadata identifier matching at least one phrase of the set of phrases; and
in response to determining that the metadata identifier matches the at least one phrase of the set of phrases, determining the node corresponding to the set of phrases.

* * * * *